United States Patent
Kamo et al.

(10) Patent No.: US 11,634,799 B2
(45) Date of Patent: Apr. 25, 2023

(54) HARD PARTICLE, SLIDING MEMBER, AND PRODUCTION METHOD OF SINTERED ALLOY

(71) Applicants: TOYOTA JIDOSHA KABUSHIKI KAISHA, Toyota (JP); FINE SINTER CO., LTD, Kasugai (JP)

(72) Inventors: Yuki Kamo, Okazaki (JP); Yusaku Yoshida, Tajimi (JP); Yuta Inoue, Kasugai (JP)

(73) Assignees: TOYOTA JIDOSHA KABUSHIKI KAISHA, Toyota (JP); FINE SINTER CO., LTD, Kasugai (JP)

( * ) Notice: Subject to any disclaimer, the term of this patent is extended or adjusted under 35 U.S.C. 154(b) by 0 days.

(21) Appl. No.: 17/494,213

(22) Filed: Oct. 5, 2021

(65) Prior Publication Data

US 2022/0112583 A1     Apr. 14, 2022

(30) Foreign Application Priority Data

Oct. 12, 2020   (JP) .............................. JP2020-171796

(51) Int. Cl.
| | |
|---|---|
| *C22C 33/02* | (2006.01) |
| *B22F 3/16* | (2006.01) |
| *C22C 30/00* | (2006.01) |
| *F16K 25/00* | (2006.01) |
| *C22C 38/16* | (2006.01) |
| *B22F 9/08* | (2006.01) |

(52) U.S. Cl.
CPC ................. *C22C 33/02* (2013.01); *B22F 3/16* (2013.01); *C22C 30/00* (2013.01); *C22C 38/16* (2013.01); *F16K 25/005* (2013.01); *B22F 9/082* (2013.01); *B22F 2009/0828* (2013.01); *B22F 2301/35* (2013.01)

(58) Field of Classification Search
None
See application file for complete search history.

(56) References Cited

U.S. PATENT DOCUMENTS

| | | | |
|---|---|---|---|
| 2004/0187830 A1 | 9/2004 | Sato et al. | |
| 2014/0271319 A1* | 9/2014 | Zheng | ................... C22C 38/22 419/9 |
| 2017/0225231 A1 | 8/2017 | Shinohara et al. | |

FOREIGN PATENT DOCUMENTS

| | | | |
|---|---|---|---|
| CN | 1517518 A | | 8/2004 |
| CN | 105088220 A | * | 11/2015 |
| CN | 107030278 A | | 8/2017 |
| JP | 2016216762 A | * | 12/2016 |
| JP | 2017-115197 A | | 6/2017 |

OTHER PUBLICATIONS

English translation of JP2016-216762, EPO, accessed Oct. 11, 2022.*

* cited by examiner

*Primary Examiner* — Xiaobei Wang
(74) *Attorney, Agent, or Firm* — Sughrue Mion, PLLC

(57) ABSTRACT

Provided is a hard particle in which Cr and W, that are quickly diffused in Mo, are present at the same time as Ni and Mn. Specifically, the hard particle contains Cr: 5% by mass to 20% by mass, W: 2% by mass to 19% by mass, Mo: 25% by mass to 40% by mass, Ni: 10% by mass to 22% by mass, Mn: 10% by mass or less, C: 2.0% by mass or less, Si: 2.0% by mass or less, and a remainder: Fe and unavoidable impurities.

8 Claims, 1 Drawing Sheet

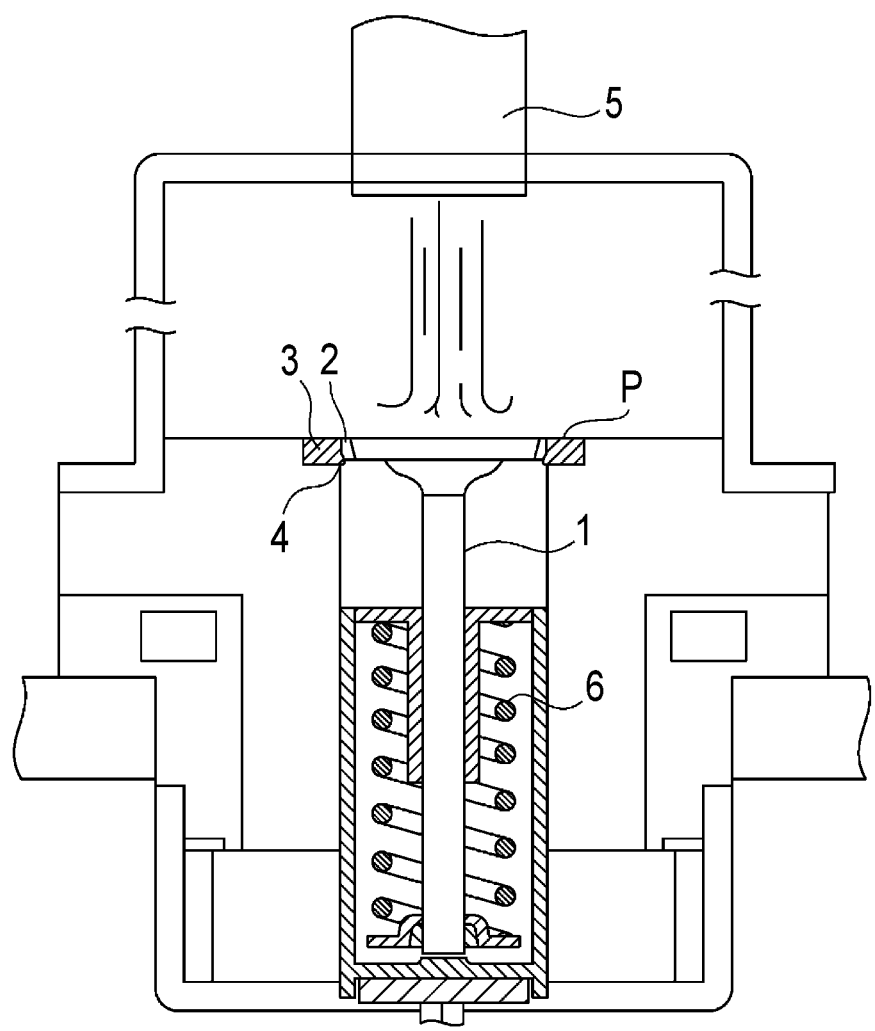

HARD PARTICLE, SLIDING MEMBER, AND PRODUCTION METHOD OF SINTERED ALLOY

CROSS-REFERENCE TO RELATED APPLICATION

This application claims priority to Japanese Patent Application No. 2020-171796 filed on Oct. 12, 2020, incorporated herein by reference in its entirety.

BACKGROUND

1. Technical Field

The present disclosure relates to a hard particle, a sliding member, and a production method of a sintered alloy. More specifically, the present disclosure relates to a hard particle for obtaining a sintered alloy having excellent wear resistance and capable of being a sliding member of an internal combustion engine, particularly a valve seat, a sliding member obtained using the hard particle, and a production method of a sintered alloy that can be a sliding member.

2. Description of Related Art

An engine valve seat of a vehicle (hereinafter, simply referred to as a "valve seat") plays a role of ensuring a pressure in a combustion chamber by coming into close contact with a valve in a case where the valve is closed. Such a valve seat is requested to have high wear resistance when exposed to a severe sliding environment of a high temperature and low oxidation.

As the valve seat having excellent wear resistance, a sintered valve seat made of an iron-based sintered alloy to which a hard particle is added is known. Above all, it is known that the valve seat made of the iron-based sintered alloy formed by using CoMo-based hard particles dispersed in an Fe—C-based matrix can ensure both the wear resistance and productivity.

However, since the CoMo-based hard particle uses Co, a cost is high, and there is a concern about a risk of procurement. Accordingly, it has been desired to realize a valve seat that exhibits high wear resistance with a hard particle containing no Co.

On the other hand, Japanese Unexamined Patent Application Publication No. 2017-115197 (JP 2017-115197 A) proposes an FeMo-based hard particle containing Mo: 20% by mass to 35% by mass, Cr: 3% by mass to 15% by mass, Mn: 3% by mass to 15% by mass, C: less than 1.0% by mass, and a remainder: unavoidable impurities and Fe.

SUMMARY

However, since the FeMo-based hard particle is inferior in sinterability with the Fe—C-based matrix as compared with a CoMo-based hard particle in the related art, in the valve seat made of the iron-based sintered alloy formed by the FeMo-based hard particles dispersed in the Fe—C-based matrix, at the time of processing and operation, the hard particle may fall off from the matrix and the wear resistance may be decreased.

The present disclosure provides an FeMo-based hard particle for obtaining a sintered alloy having excellent sinterability with a matrix and excellent wear resistance and capable of being a sliding member, a sliding member containing the hard particle, and a production method of a sintered alloy containing the hard particle.

The present inventors have found that in a case where the hard particle in which Cr and W, that are quickly diffused in Mo, are present at the same time as Ni is obtained, the productivity can be ensured while the sinterability with the matrix is be improved when the sintered alloy is produced, and have completed the present disclosure. That is, the present disclosure is as described below.

A first aspect of the present disclosure relates to a hard particle containing Cr: 5% by mass to 20% by mass, W: 2% by mass to 19% by mass, Mo: 25% by mass to 40% by mass, Ni: 10% by mass to 22% by mass, Mn: 10% by mass or less, C: 2.0% by mass or less, Si: 2.0% by mass or less, and a remainder: Fe and unavoidable impurities.

The hard particle may contain Cr: 5% by mass to 10% by mass, W: 3% by mass to 15% by mass, Mo: 25% by mass to 35% by mass, Ni: 15% by mass to 20% by mass, Mn: 6% by mass or less, C: 1.4% by mass or less, Si: 1.4% by mass or less, and the remainder: Fe and the unavoidable impurities.

A second aspect of the present disclosure relates to a sliding member containing a matrix containing Fe as a main component and the hard particles according to the first aspect dispersed in the matrix.

The sliding member may contain Cu: 2% by mass to 12% by mass with respect to 100% by mass of the matrix. The hard particle may contain La: 1% by mass to 5% by mass.

The matrix may contain a second hard particle, and the second hard particle may contain Mo: 60% by mass to 70% by mass, Si: 2.0% by mass or less, and a remainder including Fe and unavoidable impurities.

The sliding member may be a valve seat.

A third aspect of the present disclosure relates to a production method of a sintered alloy, including a mixed powder production step of producing mixed powder containing the hard particle according to the first aspect and a particle for matrix formation, a molded body production step of molding the mixed powder with a mold to obtain a molded body, and a sintering step of sintering the molded body to obtain a sintered body.

The hard particle may be water atomized powder, and the particle for matrix formation may contain flux powder.

Since the FeMo-based hard particle according to the aspect of the present disclosure does not contain Co, a cost can be reduced and a risk of material procurement can be suppressed.

Further, since the FeMo-based hard particle according to the aspect of the present disclosure has excellent sinterability with the matrix, in a case where the valve seat or the like is formed from the obtained sintered alloy, at the time of processing and operation, falling off of the hard particle from the matrix and a decrease in the wear resistance can be suppressed.

Further, since the valve seat or the like formed using the hard particle according to the aspect of the present disclosure tends to form an oxide film on a surface of the hard particle at the time of operation, wear due to adhesion to metal that is an object for sliding can be suppressed.

Here, in general, there is a trade-off relationship between the sinterability of the hard particle to the matrix and an easy oxidation property of a particle surface. However, with the hard particle according to the aspect of the present disclosure, both the sinterability and the easy oxidation property can be realized in a well-balanced manner.

Therefore, with the hard particle according to the aspect of the present disclosure, both the sinterability when the sintered alloy is produced and a surface oxidation property of the valve seat at the time of operation can be achieved at the same time, and both the wear due to falling off of the hard particle from the matrix and the wear due to the adhesion to the object for sliding can be suppressed. As a result, with the hard particle according to the aspect of the present disclosure, high wear resistance of the obtained sintered alloy can be realized.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram showing a device used for a wear resistance test of a valve seat using sintered alloys produced in Examples and Comparative Examples.

DETAILED DESCRIPTION OF EMBODIMENTS

An embodiment of the present disclosure will be described below in detail. Note that the present disclosure is not limited to the embodiment described below, and can be implemented in various modifications.

Hard Particle

A hard particle according to the embodiment of the present disclosure contains Cr, W, Mo, and Ni as needed components, and a remainder including Fe and unavoidable impurities.

In the hard particle according to the present embodiment, Cr and W, that are quickly diffused in Mo, are present at the same time as Ni, so that when a sintered alloy is produced, sinterability with a matrix can be improved and the productivity can be ensured.

The hard particle according to the present embodiment is an FeMo-based hard particle and does not substantially contain Co. Therefore, a cost can be reduced and a risk of material procurement can be suppressed.

Average Particle Diameter of Hard Particles

An average particle diameter of the hard particles according to the present embodiment is not particularly limited, but may be 50 μm or more and 250 μm or less. Within the above range, the hard particle can be applied to various uses.

Here, the "average particle diameter" in the present specification is a number average value calculated from an equivalent circle diameter obtained by observing at least 200 or more hard particles by using a scanning electron microscope (SEM) and obtaining the equivalent circle diameter when a perfect circle equal to an area is an equal area circle.

The average particle diameter of the hard particles may be 55 μm or more, 60 μm or more, 65 μm or more, 70 μm or more, 75 μm or more, or 80 μm or more, and may be 225 μm or less, 200 μm or less, 175 μm or less, 150 μm or less, 125 μm or less, or 100 μm or less.

Each Component

The hard particle according to the present embodiment contains Cr, W, Mo, Ni, and Fe as the needed components, and contains Mn, C, Si, and La as optional components.

Cr: 5% by Mass to 20% by Mass

The hard particle according to the present embodiment contains 5% by mass to 20% by mass of Cr, preferably 5% by mass to 10% by mass of Cr, as the needed component.

Cr mainly forms a Cr carbide, increases hardness of the hard particle, and improves wear resistance. Further, in a case where an alloy is produced using the hard particle, melting of the hard particle due to sintering is suppressed. In addition, since Cr is diffused quickly in Mo to be described below, the sinterability with the matrix is improved when a sintered alloy is produced using the hard particle.

In a case where a content of Cr is less than 5% by mass, the wear resistance of the hard particle is decreased, and a melting suppressing effect of the hard particle in a case of sintering is decreased. On the other hand, in a case where the content of Cr exceeds 20% by mass, the hard particle is excessively hard, the productivity of the sintered alloy using the hard particle is decreased, and the aggression to an object for sliding is increased when a sliding member, such as a valve seat, is formed from the sintered alloy.

The content of Cr in the hard particle may be 8% by mass or more, 10% by mass or more, 12% by mass or more, or 15% by mass or more, and may be 18% by mass or less, 15% by mass or less, 12% by mass or less, or 10% by mass or less.

W: 2% by Mass to 19% by Mass

The hard particle according to the present embodiment contains 2% by mass to 19% by mass of W, preferably 3% by mass to 15% by mass of W, as the needed component.

W increases the hardness of the hard particle to improve the wear resistance. In addition, since W is diffused quickly in Mo to be described below, the sinterability with the matrix is improved when the sintered alloy is produced using the hard particle.

In a case where a content of W is less than 2% by mass, the wear resistance of the hard particle is decreased, and an effect of improving the sinterability with the matrix in a case where the alloy is produced is not observed. On the other hand, in a case where the content of W exceeds 19% by mass, the hard particle is excessively hard, the productivity of the sintered alloy using the hard particle is decreased, and the aggression to the object for sliding is increased when the sliding member, such as the valve seat, is formed from the sintered alloy.

The content of W in the hard particle may be 3% by mass or more, 7% by mass or more, 10% by mass or more, or 15% by mass or more, and may be 18% by mass or less, 15% by mass or less, 10% by mass or less, or 8% by mass or less.

Mo: 25% by Mass to 40% by Mass

The hard particle according to the present embodiment contains 25% by mass to 40% by mass of Mo, preferably 25% by mass to 35% by mass of Mo, as the needed component.

Mo mainly forms an Mo carbide, increases hardness of the hard particle, and improves the wear resistance. Further, when an Mo oxide film is formed on a surface of the hard particle to form the sliding member, such as the valve seat, from the sintered alloy using the hard particle, wear due to the adhesion to metal that is the object for sliding is suppressed, and the wear resistance is improved.

In a case where a content of Mo is less than 25% by mass, the wear resistance of the hard particle is decreased. On the other hand, in a case where the content of Mo exceeds 40% by mass, the hard particle is excessively hard, the productivity of the sintered alloy using the hard particle is decreased, and the aggression to the object for sliding is increased when the sliding member, such as the valve seat, is formed from the sintered alloy.

The content of Mo in the hard particle may be 28% by mass or more, 30% by mass or more, 33% by mass or more, or 35% by mass or more, and may be 38% by mass or less, 35% by mass or less, 33% by mass or less, or 30% by mass or less.

Ni: 10% by Mass to 22% by Mass

The hard particle according to the present embodiment contains 10% by mass to 22% by mass of Ni, preferably 15% by mass to 20% by mass of Ni, as the needed component.

Ni increases the hardness of the hard particle to improve the wear resistance. In addition, since Ni is diffused quickly in Mo to be described below, the sinterability with the matrix is improved when the sintered alloy is produced using the hard particle.

In a case where a content of Ni is less than 10% by mass, heat resistance of the hard particle is decreased, the wear resistance is decreased, and the sinterability with the matrix in a case where the alloy is produced is decreased. On the other hand, in a case where the content of Ni exceeds 22% by mass, the hardness of the hard particle is decreased and the wear resistance is decreased.

The content of Ni in the hard particle may be 13% by mass or more, 14% by mass or more, or 15% by mass or more, and may be 20% by mass or less, 19% by mass or less, or 18% by mass or less.

Mn: 10% by Mass or Less

In the hard particle according to the present embodiment, a content of Mn is 10% by mass or less, preferably 6% by mass or less.

Mn improves the sinterability with the matrix when the sintered alloy is produced using the hard particle.

In a case where the content of Mn exceeds 10% by mass, the sinterability with the matrix is decreased when the sintered alloy is produced using the hard particle. On the other hand, in a case where the content of Mn is too small, the wear resistance is decreased.

The content of Mn in the hard particle may be 8% by mass or less, 6% by mass or less, 4% by mass or less, or 2% by mass or less, or may not be contained, and may be 0.1% by mass or more, 0.5% by mass or more, 1% by mass or more, or 2% by mass or more.

C: 2.0% by Mass or Less

In the hard particle according to the present embodiment, the content of C is 2.0% by mass or less, preferably 1.4% by mass or less.

C mainly forms the Mo carbide, increases hardness of the hard particle, and improves the wear resistance.

In a case where the content of C exceeds 2.0% by mass, the hard particle is excessively hard, the productivity of the sintered alloy using the hard particle is decreased, and the aggression to the object for sliding is increased when the sliding member, such as the valve seat, is formed from the sintered alloy.

The content of C in the hard particle may be 1.8% by mass or less, 1.6% by mass or less, 1.4% by mass or less, 1.2% by mass or less, or 1.0% by mass or less, and may be 0.1% by mass or more, 0.3% by mass or more, 0.5% by mass or more, or 0.7% by mass or more.

Si: 2.0% by Mass or Less

In the hard particle according to the present embodiment, a content of Si is 2.0% by mass or less, preferably 1.4% by mass or less.

Si mainly forms silicide, increases hardness of the hard particle, and improves the wear resistance.

In a case where the content of Si exceeds 2.0% by mass, the hard particle is excessively hard, the productivity of the sintered alloy using the hard particle is decreased, and the aggression to the object for sliding is increased when the sliding member, such as the valve seat, is formed from the sintered alloy. On the other hand, when the content of Si is too small, the hardness of the particle is too low, and it is difficult to exhibit the function as the hard particle.

The content of Si in the hard particle may be 1.8% by mass or less, 1.6% by mass or less, 1.4% by mass or less, 1.2% by mass or less, or 1.0% by mass or less, and may be 0.1% by mass or more, 0.3% by mass or more, 0.5% by mass or more, or 0.7% by mass or more.

La: 1% by Mass to 5% by Mass

The hard particle according to the present embodiment may contain 1% by mass to 5% by mass of La, as the optional component. The hard particle according to the present embodiment may preferably contain 2% by mass to 5% by mass of La.

It is preferable that La be contained as a component of the hard particle in a case where Cu to be described below is applied to mixed powder for the purpose of promoting sintering when the sintered alloy is produced using the hard particle. Therefore, in a case where Cu is not applied to the mixed powder, La may not be contained as a component of the hard particle.

In general, there is a trade-off relationship between the sinterability of the hard particle to the matrix and an easy oxidation property of a particle surface. Therefore, when Cu is applied to the mixed powder for producing the sintered alloy, the sintering is promoted, but the formability of the oxide film on the particle surface having the trade-off relationship with the sinterability is decreased. As a result, the wear resistance is decreased when the sliding member, such as the valve seat, is formed from the sintered alloy.

On the other hand, in a case where Cu is applied to the mixed powder for producing the sintered alloy, when the hard particle contains 1% by mass to 5% by mass of La, the sinterability of the hard particle to the matrix and the formability of the oxide film on the particle surface that have the trade-off relationship with the sinterability can be realized in a well-balanced manner, and the decrease in the wear resistance can be suppressed while the sinterability is ensured.

In a case where a content of La is less than 1% by mass, the effect described above is not sufficient. On the other hand, in a case where the content of La exceeds 5% by mass, the sinterability with the matrix when the alloy is produced is decreased.

The content of La in the hard particle may be 1.5% by mass or more, 2.0% by mass or more, 2.5% by mass or more, or 3.0% by mass or more, and may be 4.5% by mass or less, 4.0% by mass or less, 3.5% by mass or less, or 3.0% by mass or less.

Remainder: Fe and Unavoidable Impurities

The hard particle according to the present embodiment contains Fe and the unavoidable impurities as the remainder of the needed components described above.

Fe plays a role in improving diffusivity of the hard particle into iron powder. Therefore, when a content of Fe is too small, when the sintered alloy is produced using the hard particle, the diffusivity of the hard particle into the iron powder is decreased, and the hard particle are likely to fall off from the sintered body containing the hard particle. As a result, when the sliding member, such as the valve seat, is formed from the sintered alloy, the wear resistance is decreased. Further, for example, in a case where the content of Fe in the hard particle is less than 20% by mass, the productivity of the sintered alloy using the hard particle is decreased.

On the other hand, when the content of Fe is excessive, the heat resistance and the wear resistance of the hard particle are significantly decreased.

The content of Fe in the hard particle may be 20% by mass or more, 25% by mass or more, 30% by mass or more, 35% by mass or more, or 40% by mass or more.

Production Method of Hard Particle

A production method of the hard particle according to the embodiment of the present disclosure is not particularly limited. A known production method can be applied, and examples thereof include a gas atomization method, a water atomization method, a plasma rotating electrode method, and a vacuum atomization method.

Use of Hard Particle

The hard particle according to the embodiment of the present disclosure can be suitably used for various uses that request rigidity. The use is not particularly limited, but for example, the sintered alloy having high wear resistance can be produced by sintering the mixed powder containing the hard particle according to the embodiment of the present disclosure.

Further, due to the wear resistance, the obtained sintered alloy can be suitably used for various sliding members, and for example, can be suitably used for a use, such as the engine valve seat of the vehicle, that is exposed to a severe sliding environment with a high temperature and low oxidation and requests high wear resistance.

Production Method of Sintered Alloy

A production method of the sintered alloy according to the present embodiment is a method of producing the sintered alloy containing the hard particle according to the present embodiment described above. Further, the production method of the sintered alloy includes a mixed powder production step, a molded body production step, and a sintering step.

Mixed Powder Production Step

The mixed powder production step is a step of producing mixed powder containing the hard particle according to the present embodiment described above and a particle for matrix formation that serves as the matrix when formed into the sintered alloy.

As long as the mixed powder to be produced contains the hard particle according to the present embodiment described above, a component that serves as the particle for matrix formation is not particularly limited. As the particle for matrix formation, for example, powder containing a graphite particle and an iron particle is preferable.

Hard Particle

Assuming that a total amount of the mixed powder is 100% by mass, a blending amount of the hard particle is preferably 5% by mass to 50% by mass, and may be 10% by mass to 45% by mass or 15% by mass to 40% by mass.

In a case where the blending amount of the hard particle in the mixed powder is less than 5% by mass, the sinterability and the wear resistance of the sintered alloy obtained by the production method of the sintered alloy according to the present embodiment are not sufficient. On the other hand, in a case where the blending amount of the hard particle exceeds 50% by mass, the productivity of the sintered alloy is decreased. Particle for Matrix Formation Graphite Particle The graphite particle is the particle for matrix formation. Assuming that the total amount of the mixed powder is 100% by mass, a blending amount of graphite particle is preferably 0.6% by mass to 2.0% by mass, and may be 0.7% by mass to 1.8% by mass, 0.8% by mass to 1.6% by mass, or 1.0% by mass to 1.4% by mass.

In a case where the blending amount of the graphite particle is less than 0.6% by mass, ferrite is increased in the sintered alloy obtained by the production method of the sintered alloy according to the present embodiment, and the wear resistance is decreased. On the other hand, in a case where the blending amount of the graphite particle exceeds 2.0% by mass, hard cementite appears and the productivity of the sintered alloy is decreased.

Iron Particle

The iron particle is the particle for matrix formation. The iron particle forms most of the matrix in the sintered alloy produced by the production method of the sintered alloy according to the present embodiment. As the iron particle, for example, pure iron powder or low alloy steel powder can be used.

The blending amount of the iron particle is not particularly limited, and assuming that the total amount of the mixed powder is 100% by mass, the remainder of other components of the mixed powder can be the iron particle.

Cu

Cu may be optionally blended to the mixed powder produced in the mixed powder production step as the particle for matrix formation. Cu can be used as copper powder.

Cu exhibits an effect of promoting sintering when the sintered alloy is produced using the hard particle.

However, in general, there is the trade-off relationship between the sinterability of the hard particle to the matrix and the easy oxidation property of the particle surface. Therefore, when Cu is applied as the particle for matrix formation for producing the sintered alloy, sintering is promoted, but the formability of the oxide film on the particle surface having the trade-off relationship with sinterability is decreased. As a result, when the sliding member, such as the valve seat, is formed from the sintered alloy, the wear resistance is decreased.

Therefore, in a case where Cu is added to the mixed powder as the particle for matrix formation for the purpose of promoting sintering, it is preferable to apply the hard particle containing 1% by mass to 5% by mass of La as described above. When the particle containing 1% by mass to 5% by mass of La is applied, as the hard particle, together with Cu, the decrease in the wear resistance can be suppressed while the sinterability is ensured.

Assuming that the total amount of the mixed powder is 100% by mass, a blending amount of Cu may be 2% by mass to 12% by mass, 2% by mass to 10% by mass, 3% by mass to 8% by mass, or 3% by mass to 5% by mass.

In a case where the blending amount of Cu is less than 2% by mass, an effect obtained by adding Cu is not sufficient, and it is difficult to obtain the promotion of sintering. On the other hand, in a case where the blending amount of Cu exceeds 12% by mass, the wear resistance and the productivity of the obtained sintered alloy are decreased.

Second Hard Particle

A second hard particle may be optionally blended to the mixed powder produced in the mixed powder production step as the particle for matrix formation. The wear resistance of the obtained sintered alloy can be further improved by blending the second hard particle.

The second hard particle may be, for example, the hard particle containing 60% by mass to 70% by mass of Mo, 2.0% by mass or less of Si, and the remainder including Fe and the unavoidable impurities.

Further, in average particle diameter of the second hard particles may be 1 μm or more and less than 50 μm. Within the above range, the particle diameter is smaller than and does not overlap with the average particle diameter of the hard particles according to the present embodiment, so that an effect of blending the second hard particle is clear.

Assuming that the total amount of the mixed powder is 100% by mass, a blending amount of the second hard particle may be 1% by mass to 5% by mass, 1% by mass to 4% by mass, or 2% by mass to 3% by mass.

In a case where the blending amount of the second hard particle is less than 1% by mass, the effect of adding the second hard particle is not sufficient, and it is difficult to obtain the improvement of the wear resistance. On the other hand, in a case where the blending amount of the second hard particle exceeds 5% by mass, a flow of the mixed powder is impaired and the productivity of the sintered alloy is decreased.

Molded Body Production Step

In the molded body production step, the mixed powder produced in the mixed powder production step is molded with a mold to obtain a molded body.

A method of molding the molded body from the mixed powder is not particularly limited, and a known method can be applied. Examples thereof include powder molding.

In addition, a shape and a size of the molded body are not particularly limited. The shape and the size thereof can be appropriately decided depending on the use of the finally obtained sintered body.

Sintering Step

In the sintering step, the molded body produced in the molded body production step is sintered to obtain the sintered body. Then, the obtained sintered body serves as the sintered alloy.

In a case where the graphite particle and the iron particle are contained, as the particle for matrix formation, in the mixed powder for obtaining the molded body, in the sintering step, C of the graphite particle in the molded body is sintered while being diffused in the hard particle and the iron particle. As a result, an iron-based sintered alloy having both the wear resistance and the sinterability can be produced.

Embodiment of Production Method of Sintered Alloy of Present Disclosure

Examples of a suitable aspect to which the production method of the sintered alloy according to the embodiment of the present disclosure can be applied include an aspect in which the hard particle according to the embodiment of the present disclosure blended in the mixed powder is water atomized powder produced by the water atomization method, and flux powder is contained, as the particle for matrix formation, in the mixed powder.

The water atomized powder produced by the water atomization method is cheaper than gas atomized powder produced by the gas atomization method, but a powder surface tends to be oxidized at the time of powder production, and thus the sinterability with the matrix is inferior.

However, by containing the flux powder as the particle for matrix formation in the mixed powder, the sinterability of the obtained sintered body can be improved.

The flux powder is not particularly limited, but when the flux powder is, for example, a potassium fluoride (KF)-aluminum fluoride (AlF)-based flux powder, a function of removing the oxide film at the time of sintering is provided, so that an effect can be improved.

Assuming that the total amount of the mixed powder is 100% by mass, a blending amount of the flux powder may be 0.2% by mass to 1.5% by mass, 0.2% by mass to 1.0% by mass, or 0.3% by mass to 0.8% by mass.

In a case where the blending amount of the flux powder is less than 0.2% by mass, an effect of adding the flux powder is not sufficient, and it is difficult to obtain the effect of improving the sinterability with the matrix when the water atomized powder is used. On the other hand, in a case where the blending amount of the flux powder exceeds 1.5% by mass, a flow of the mixed powder is impaired and the productivity of the sintered alloy is decreased.

Use of Sintered Alloy

The sintered alloy obtained by the production method of the sintered alloy according to the present embodiment has the matrix containing Fe as a main component, and has a structure in which the hard particles according to the present embodiment are dispersed in the matrix.

The sintered alloy obtained by the production method of the sintered alloy according to the present embodiment can be suitably used for various uses that request the wear resistance. The use is not particularly limited, but for example, the sintered alloy can be suitably used as various sliding members.

Further, the sintered alloy obtained by the production method of the sintered alloy according to the present embodiment can be suitably used for the use, such as the engine valve seat of the vehicle, that is exposed to a severe sliding environment with a high temperature and low oxidation and requests high wear resistance.

Hereinafter, the present embodiment will be described in more detail with experimental results.

Examples 1 to 13 and Comparative Examples 1 to 8

Production of Hard Particle

Powder was produced by using a raw material weighed to have a composition shown in Table 1 by the gas atomization method or the water atomization method, and the obtained powder was classified into 44 μm to 250 μm and used as the hard particle. The average particle diameter of the hard particles was 100 μm.

TABLE 1

| | | Component (wt %) of hard particle | | | | | | | | | Entire component (wt %) of seat | | | | | | |
|---|---|---|---|---|---|---|---|---|---|---|---|---|---|---|---|---|---|
| | Atomization method | Fe | Mo | Cr | W | Ni | Mn | C | Si | La | Hard particle | Gr (C) | Cu | Flux | FeMo | Fe | Wear ratio |
| Example 1 | Gas | 32.2 | 30 | 5 | 15 | 15 | 0 | 1.4 | 1.4 | 0 | 40 | 1.0 | 0 | 0 | 0 | Bal | 0.9 |
| Example 2 | Gas | 32.6 | 30 | 5 | 15 | 15 | 0 | 1.4 | 1.0 | 0 | 40 | 1.0 | 0 | 0 | 0 | Bal | 1.0 |
| Example 3 | Gas | 33.0 | 33 | 5 | 7 | 20 | 0 | 1.0 | 1.0 | 0 | 40 | 1.0 | 0 | 0 | 0 | Bal | 1.0 |
| Example 4 | Gas | 35.2 | 30 | 10 | 7 | 15 | 0 | 1.4 | 1.4 | 0 | 40 | 1.0 | 0 | 0 | 0 | Bal | 0.9 |
| Example 5 | Gas | 35.2 | 30 | 10 | 7 | 15 | 0 | 1.4 | 1.4 | 0 | 40 | 1.0 | 5 | 0 | 0 | Bal | 0.6 |
| Example 6 | Gas | 35.2 | 30 | 10 | 7 | 15 | 0 | 1.4 | 1.4 | 0 | 40 | 1.0 | 3 | 0 | 0 | Bal | 0.7 |
| Example 7 | Gas | 28.7 | 30 | 10 | 7 | 15 | 6 | 1.4 | 1.4 | 0.5 | 40 | 1.0 | 3 | 0 | 0 | Bal | 0.7 |
| Example 8 | Gas | 28.2 | 30 | 10 | 7 | 15 | 6 | 1.4 | 1.4 | 1.0 | 40 | 1.0 | 3 | 0 | 0 | Bal | 0.4 |
| Example 9 | Gas | 27.2 | 30 | 10 | 7 | 15 | 6 | 1.4 | 1.4 | 2.0 | 40 | 1.0 | 3 | 0 | 0 | Bal | 0.3 |

TABLE 1-continued

| | Atomization method | Component (wt %) of hard particle | | | | | | | | | Entire component (wt %) of seat | | | | | | Wear ratio |
|---|---|---|---|---|---|---|---|---|---|---|---|---|---|---|---|---|---|
| | | Fe | Mo | Cr | W | Ni | Mn | C | Si | La | Hard particle | Gr (C) | Cu | Flux | FeMo | Fe | |
| Example 10 | Gas | 27.2 | 30 | 10 | 7 | 15 | 6 | 1.4 | 1.4 | 2.0 | 40 | 1.0 | 3 | 0 | 3 | Bal | 0.2 |
| Example 11 | Gas | 27.2 | 30 | 10 | 7 | 15 | 6 | 1.4 | 1.4 | 2.0 | 40 | 1.0 | 5 | 0 | 0 | Bal | 0.5 |
| Example 12 | Gas | 26.2 | 35 | 10 | 3 | 15 | 6 | 1.4 | 1.4 | 2.0 | 40 | 1.0 | 5 | 0 | 0 | Bal | 0.4 |
| Example 13 | Water | 27.2 | 30 | 10 | 15 | 15 | 0 | 1.4 | 1.4 | 0 | 40 | 1.2 | 5 | 0.4 | 0 | Bal | 0.8 |
| Comparative Example 1 | Gas | 30.2 | 30 | 2 | 20 | 15 | 0 | 1.4 | 1.4 | 0 | 40 | 1.0 | 0 | 0 | 0 | Bal | 1.6 |
| Comparative Example 2 | Gas | 37.0 | 30 | 19 | 7 | 5 | 0 | 1.0 | 1.0 | 0 | 40 | 1.0 | 0 | 0 | 0 | Bal | 1.3 |
| Comparative Example 3 | Gas | 47.2 | 30 | 5 | 0 | 15 | 0 | 1.4 | 1.4 | 0 | 40 | 1.0 | 0 | 0 | 0 | Bal | 1.8 |
| Comparative Example 4 | Gas | 30.0 | 23 | 15 | 10 | 20 | 0 | 1.0 | 1.0 | 0 | 40 | 1.0 | 0 | 0 | 0 | Bal | 1.8 |
| Comparative Example 5 | Gas | 31.0 | 33 | 5 | 7 | 22 | 0 | 1.0 | 1.0 | 0 | 40 | 0.5 | 0 | 0 | 0 | Bal | 1.7 |
| Comparative Example 6 | Gas | 28.0 | 33 | 5 | 7 | 25 | 0 | 1.0 | 1.0 | 0 | 40 | 1.0 | 0 | 0 | 0 | Bal | 1.6 |
| Comparative Example 7 | Gas | 27.2 | 30 | 10 | 7 | 15 | 6 | 1.4 | 1.4 | 2.0 | 40 | 1.0 | 0 | 0 | 0 | Bal | 1.2 |
| Comparative Example 8 | Gas | 28.2 | 30 | 10 | 7 | 15 | 6 | 1.4 | 1.4 | 1.0 | 40 | 1.0 | 15 | 0 | 0 | Bal | 1.3 |
| Comparative Example 9 | Water | 27.2 | 30 | 10 | 15 | 15 | 0 | 1.4 | 1.4 | 0 | 40 | 1.2 | 5 | 0 | 0 | Bal | 1.2 |

Production of Sintered Alloy

Mixed Powder Production Step

The mixed powder using the following materials was produced to have the composition shown in Table 1. Assuming that total amount of the mixed powder was 100% by mass, 0.8% by mass of zinc stearate was blended to each mixed powder as a lubricant.

graphite particle: graphite particle (CPB-S, Nippon Kokuen Group)

iron particle: reduced iron powder (JIP255M-90, JFE Steel Corporation)

Cu particle: atomized copper powder (Cu—At-G-100, FUKUDA METAL FOIL&POWDER CO., LTD.)

flux: NOCOLOKFLUX, Solvay second hard particle: FeMo particle having average particle diameter of 25 μm (Mo: 65% by mass, Si: 1% by mass, and remainder: Fe)

Molded Body Production Step

The mold was filled with mixed powder produced above, the mixed powder was pressure-molded at a surface pressure of 784 MPa to produce the molded body.

Sintering Step

The molded body produced above was sintered at 1100° C. for 30 minutes in a nitrogen atmosphere to produce a seat that serves as the sintered alloy.

Evaluation of Sintered Body

The sintered alloys produced in Examples and Comparative Examples were used as the valve seat and subjected to a wear resistance test by the following test method by a device shown in FIG. 1. The results are shown in Table 1.

Test Method

The sintered alloys obtained in Examples and Comparative Examples were used as a valve seat 3 and disposed on a sliding portion of an engine valve 1. A propane gas burner 5 was used as a heating source, and a sliding portion between a valve face 2 and the valve seat 3 was in a propane gas combustion atmosphere. A temperature of the valve seat 3 was controlled to 300° C., a load of 18 kgf was applied by a spring 6 when the valve face 2 and the valve seat 3 came into contact with each other, the valve face 2 and the valve seat 3 were brought into contact with each other at a rate of 2000 times/min, and a wear test was conducted for 8 hours.

After the wear test, an amount of valve sinking from a reference position P was measured. The amount of valve sinking corresponds to an amount of wear (wear depth) of both the engine valve 1 and the valve seat 3 worn due to the contact of the engine valve 1 and the valve seat 3, and a wear ratio when Example 2 is 1.0 is described in Table 1.

What is claimed is:

1. A sliding member comprising:
   a matrix containing Fe as a main component; and
   hard particles dispersed in the matrix,
   wherein the hard particles comprise:
      Cr: 5% by mass to 20% by mass;
      W: 2% by mass to 19% by mass;
      Mo: 25% by mass to 40% by mass;
      Ni: 10% by mass to 22% by mass;
      Mn: 10% by mass or less;
      C: 2.0% by mass or less;
      Si: 2.0% by mass or less; and
      a remainder: Fe and unavoidable impurities.

2. The sliding member according to claim 1, wherein the matrix contains Cu in an amount of 2% by mass to 12% by mass with respect to 100% by mass of the matrix.

3. The sliding member according to claim 2, wherein the hard particles further contain La in an amount of 1% by mass to 5% by mass.

4. The sliding member according to claim 1, wherein:
   the matrix contains a second hard particle; and
   the second hard particle contains
      Mo: 60% by mass to 70% by mass,
      Si: 2.0% by mass or less, and
      a remainder: Fe and unavoidable impurities.

5. The sliding member according to claim 1, wherein the sliding member is a valve seat.

6. A production method of making the sliding member according to claim 1, comprising:
   a mixed powder production step of producing mixed powder containing the hard particles and particles for formation of the matrix;

a molded body production step of molding the mixed powder with a mold to obtain a molded body; and a sintering step of sintering the molded body to obtain the sliding member.

7. The production method according to claim 6, wherein:

the hard particles are water atomized powder; and the particles for matrix formation contain flux powder.

8. The sliding member according to claim 1, wherein the hard particles contain Cr: 5% by mass to 10% by mass, W: 3% by mass to 15% by mass, Mo: 25% by mass to 35% by mass, Ni: 15% by mass to 20% by mass, Mn: 6% by mass or less, C: 1.4% by mass or less, Si: 1.4% by mass or less, and the remainder: Fe and the unavoidable impurities.

* * * * *